United States Patent
Hamaguchi et al.

(10) Patent No.: US 7,305,714 B2
(45) Date of Patent: Dec. 4, 2007

(54) ANTI-THEFT DEVICE FOR COMPUTER APPARATUS AND A METHOD FOR PROTECTING COMPUTER APPARATUS THEREBY

(75) Inventors: Hideshi Hamaguchi, Mountain View, CA (US); Kenichi Yoneyama, Mountain View, CA (US); Kazufumi Ogi, Kadoma (JP); Masahiro Yamamoto, Kadoma (JP)

(73) Assignee: Matsushita Electric Works, Ltd., Kadoma-shi (JP)

( * ) Notice: Subject to any disclaimer, the term of this patent is extended or adjusted under 35 U.S.C. 154(b) by 834 days.

(21) Appl. No.: 10/623,510

(22) Filed: Jul. 22, 2003

(65) Prior Publication Data
US 2005/0033546 A1    Feb. 10, 2005

(51) Int. Cl.
*G06F 21/02* (2006.01)

(52) U.S. Cl. .............................. 726/34; 726/35; 70/1.5; 70/57.1; 70/58; 70/67; 70/432; 340/545.5; 340/669; 340/683

(58) Field of Classification Search ................. 726/33, 726/35, 34; 70/1.5, 57.1, 58, 67; 340/542, 340/566, 568.1, 568.4, 571, 572.8, 586, 384.4, 340/384.6, 545.5, 669, 683
See application file for complete search history.

(56) References Cited

U.S. PATENT DOCUMENTS

| | | | | |
|---|---|---|---|---|
| 5,317,304 A | * | 5/1994 | Choi | 340/571 |
| 5,574,429 A | * | 11/1996 | Streeter | 340/571 |
| 5,748,083 A | * | 5/1998 | Rietkerk | 340/568.2 |
| 5,757,270 A | * | 5/1998 | Mori | 340/568.41 |
| 5,760,690 A | * | 6/1998 | French | 340/571 |
| 5,926,092 A | * | 7/1999 | Kim | 340/571 |
| 6,133,830 A | * | 10/2000 | D'Angelo et al. | 340/571 |
| 6,137,409 A | * | 10/2000 | Stephens | 340/568.1 |
| 6,218,941 B1 | * | 4/2001 | Cromer et al. | 340/572.1 |
| 6,529,144 B1 | * | 3/2003 | Nilsen et al. | 341/20 |
| 6,954,147 B1 | * | 10/2005 | Cromer et al. | 340/568.1 |
| 6,970,095 B1 | * | 11/2005 | Lee et al. | 340/669 |

FOREIGN PATENT DOCUMENTS

| | | |
|---|---|---|
| JP | 05-35354 | 2/1993 |
| JP | 6-109755 | 4/1994 |
| JP | 6-331646 | 12/1994 |
| JP | 8-249546 | 9/1996 |
| JP | 8-327656 | 12/1996 |
| JP | 09-185554 | 7/1997 |
| JP | 2000-172960 | 6/2000 |

\* cited by examiner

*Primary Examiner*—Emmanuel L. Moise
*Assistant Examiner*—Paul Callahan
(74) *Attorney, Agent, or Firm*—Oblon, Spivak, McClelland, Maier & Neustadt, P.C.

(57) ABSTRACT

An anti-theft device for a computer device, including a main body having at least one protrusion portion which protrudes from the computer device when the body is connected to the computer device, an acceleration sensor provided in the main body and configured to detect impact, a detection processing unit positioned in the main body and configured to output a signal based on the impact detected by the acceleration sensor, a first memory unit including a driver program which facilitates communication between the detection processing unit and the personal computer, a program transfer unit which temporarily installs the driver program in the computer device, a connector configured to attach the body to the computer device and facilitate electrical connection between the computer device and detection processing unit, and an indicator configured to provide indication according to the signal.

20 Claims, 13 Drawing Sheets

ANTI-THEFT DEVICE FOR COMPUTER APPARATUS AND A METHOD FOR PROTECTING COMPUTER APPARATUS THEREBY

BACKGROUND OF THE INVENTION

1. Field of the Invention

The present invention relates to an anti-theft device for a computer apparatus.

2. Discussion of the Background

Continuing proliferation and development of computer devices for business, academic and private usages include smaller, lighter and thus more easy-to-carry computer devices such as laptop computers and PDA (Personal Digital Assistant) devices. On the other hand, that development have led such computer devices more susceptible to thefts in places like business offices, schools and libraries. Several types of anti-theft devices are currently in the market. For example, in wire-type anti-theft devices, a lock device connected to a long wire is directly connected to a security slot in a laptop computer and the other end of the wire is wrapped around a fixture such as a table and a desk. Alarm-type anti-theft devices have a hook which can be connected to a security slot in a laptop computer, and an alarm device equipped with a vibration sensor and a dial lock with a wire for connecting the alarm device and hook. PC interactive anti-theft devices include devices which are inserted in a PC card slot in their entirety. These PC interactive anti-theft devices primarily protect a PC device by alerting via the PC device's screen or speaker and locking the PC device or its data, i.e., securing access to data in a computer device, thereby preventing data from being altered or stolen.

SUMMARY OF THE INVENTION

According to one aspect of the present invention, an anti-theft device for a computer device includes a main body having at least one protrusion portion which protrudes from the computer device when the body is connected to the computer device, an acceleration sensor provided in the main body and configured to detect impact, a detection processing unit positioned in the main body and configured to output a signal based on the impact detected by the acceleration sensor, a first memory unit including a driver program which facilitates communication between the detection processing unit and the computer device, a program transfer unit which temporarily installs the driver program in the computer device, a connector configured to attach the body to the computer device and facilitate electrical connection between the computer device and detection processing unit, and an indicator configured to provide indication according to the signal.

According to another aspect of the present invention, an anti-theft device for a computer device includes a detector for detecting impact, a detection processor for outputting a signal based on the impact, a connector for facilitating electrical connection between the computer device and a detection processor, an indicator for providing indication according to the signal, and a protrusion portion positioned to protrude from the computer device when the connector is connected to the computer device, wherein the indicator is provided in the protrusion portion.

According to yet another aspect of the present invention, a method for protecting a computer device includes providing an anti-theft device including a main body having at least one protrusion portion which protrudes from the computer device when the body is connected to the computer device, an acceleration sensor provided in the main body and configured to detect impact, a detection processing unit positioned in the main body and configured to output a signal based on the impact detected by the acceleration sensor, a first memory unit including a driver program which facilitates communication between the detection processing unit and the computer device, a program transfer unit which temporarily installs the driver program in the computer device, a connector configured to attach the body to the computer device and facilitate electrical connection between the computer device and detection processing unit, and an indicator configured to provide indication according to the signal and positioned on the body, attaching the anti-theft device to a computer device via the connector, temporarily installing the driver program in the computer device by the program transfer unit, and facilitating communication between the detection processing unit and the computer device by the driver program.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
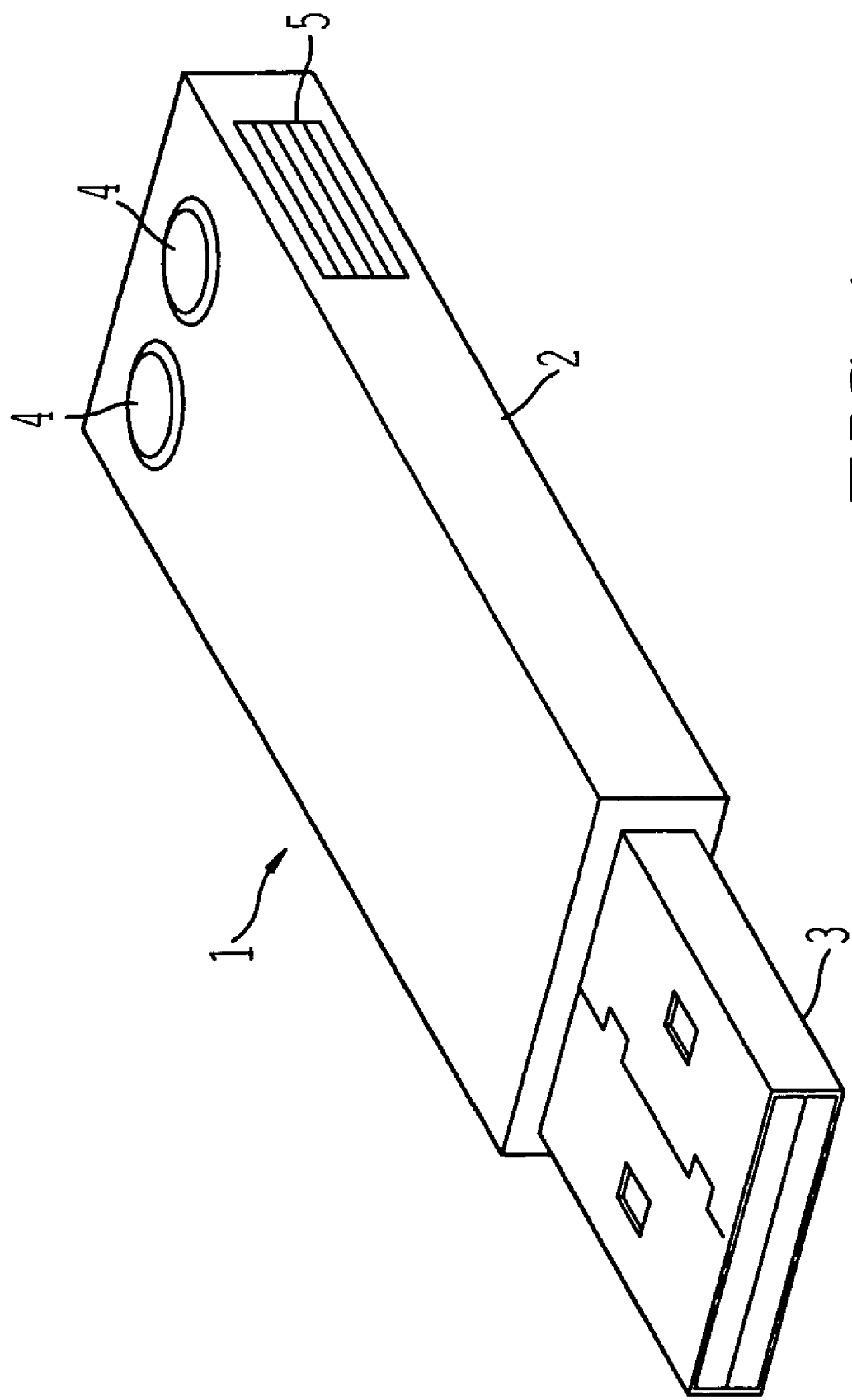
FIG. 1 is a perspective view of an anti-theft device according to one embodiment of the present invention.

The preferred embodiments will now be described with reference to the accompanying drawings, wherein like reference numerals designate corresponding or identical elements throughout the various drawings.

FIG. 1 is a perspective view of an anti-theft device according to one embodiment of the present invention. Referring to FIG. 1, the anti-theft device 1 has a main body 2 and a connecting portion 3, and the main body 2 has an indicator 4 and a secondary indicator 5. According to this embodiment, the connection portion 3 connects the main body 2 to a personal computer device via a USB port, and thus the main body 2 noticeably protrudes from a computer device when the anti-theft device 1 is attached to it. The indicator 4 on the main body 2 is, for example, an LED, and conspicuously emits visible light. Thus, the anti-theft device 1 further provides a visible warning effectively. The secondary indicator 5 on the main body 2 is, for example, a speaker, and generates audible sounds to alert a user and people nearby. Thus, the indicator 4 as well as the noticeable protrusion of the main body 2 deter thieves more effectively.

Figure 2:
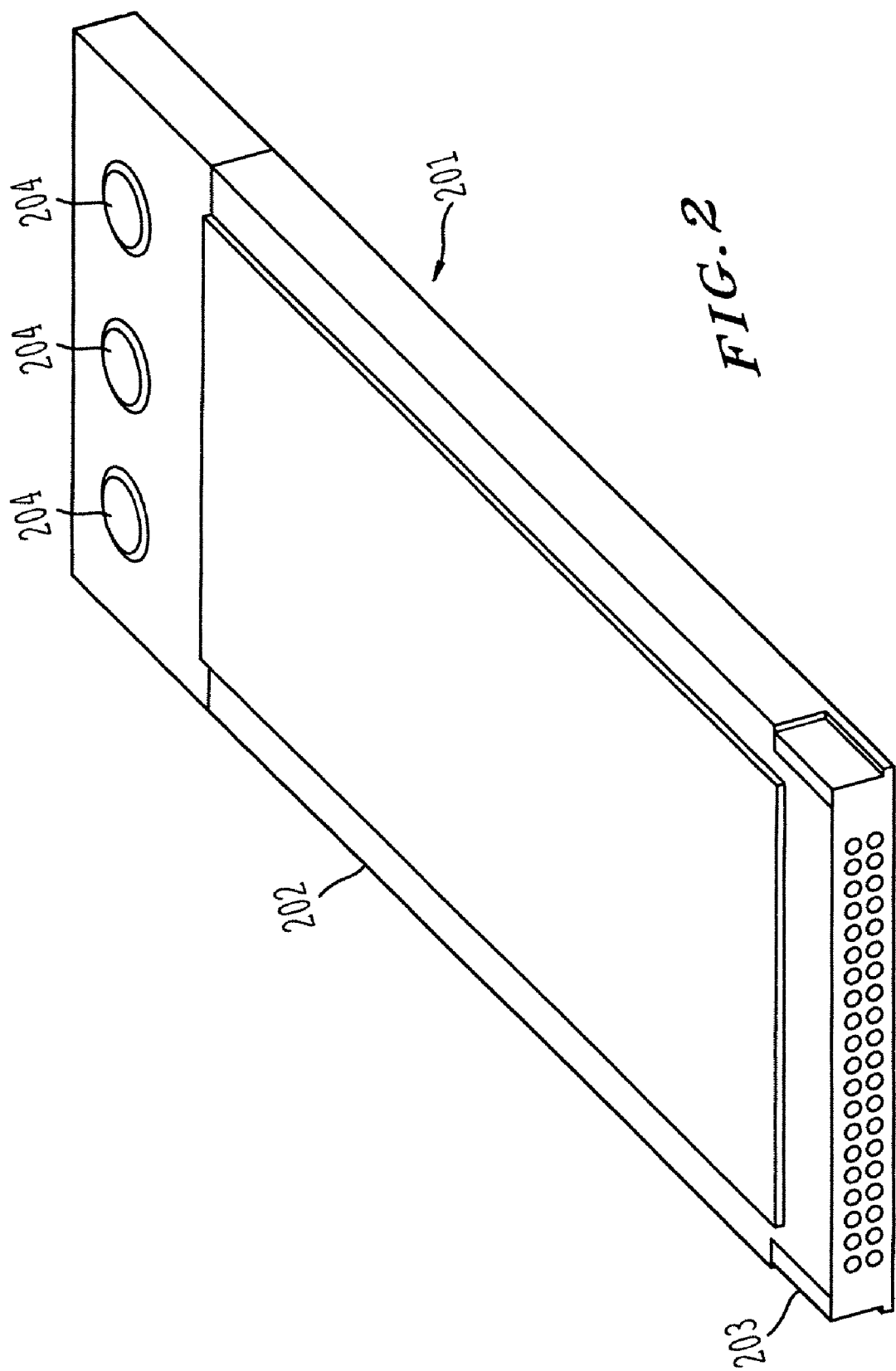
FIG. 2 is a perspective view of an anti-theft device according to another embodiment of the present invention.

FIG. 2 is a perspective view of an anti-theft device according to another embodiment of the present invention. Referring to FIG. 2, the anti-theft device 201 has a main body 202 and a connecting portion 203, and the main body 202 has an indicator 204. According to this embodiment, the connection portion 203 connects the main body 202 to a personal computer device via a PCMCIA card slot such that an end portion of the main body 202 protrudes from a computer device when the anti-theft device 1 is attached to it, thereby making thieves visibly recognize its protection before they attempt to disturb the computer device, i.e., thieves are more effectively deterred from disturbing the computer devices. The indicator 204 on the main body 202 is, for example, a light emitting device or a sound generating device, and emits visible light or generates audible sounds. Thus, the anti-theft device 1 provides a visible or an audible warning effectively.

Figure 3:
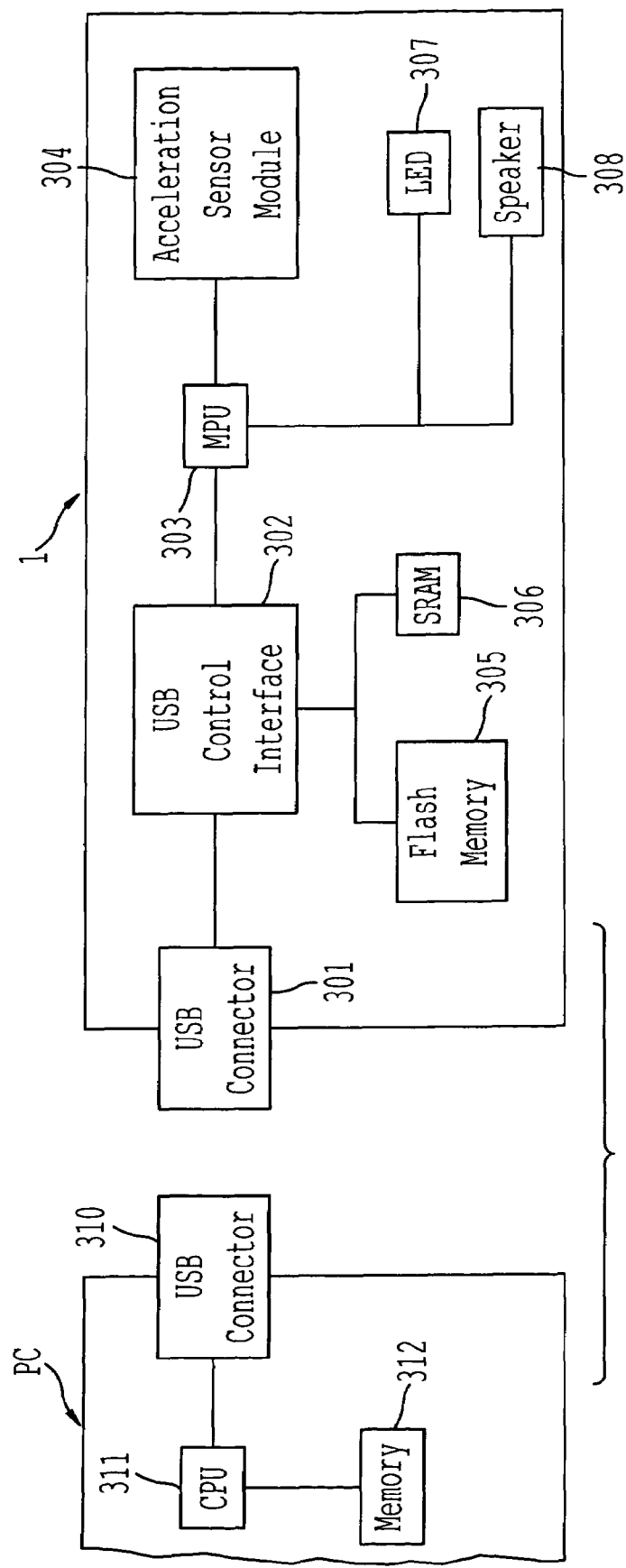
FIG. 3 is a block diagram of the anti-theft devices shown in FIGS. 1 and 2.

FIG. 3 is a block diagram of the anti-theft devices 1, 201 shown in FIGS. 1 and 2. Referring to FIG. 3, the anti-theft devices 1, 201 shown in FIGS. 1 and 2 include a USB connector 301, a USB control interface 302, a MPU 303, an acceleration sensor module 304, a flash memory 305, and SRAM 306. The USB connector 301 connects to a USB connector 310 in a personal computer and the USB control interface 302, the USB control interface 302 is connected to the USB connector 301, the MPU 303, flash memory 305, and SRAM 306 as shown in FIG. 2, and the MPU 303 is connected to the acceleration sensor module 304. By providing the MPU 303 in the anti-theft devices 1, 201 themselves, the anti-theft devices 1, 201 identify the type of an operation system in a computer device by simply connecting to a computer device and automatically installs a driver thereto. Therefore, the anti-theft devices 1, 201 perform their functions without relying on an operation system in a computer device being protected.

Figure 4:
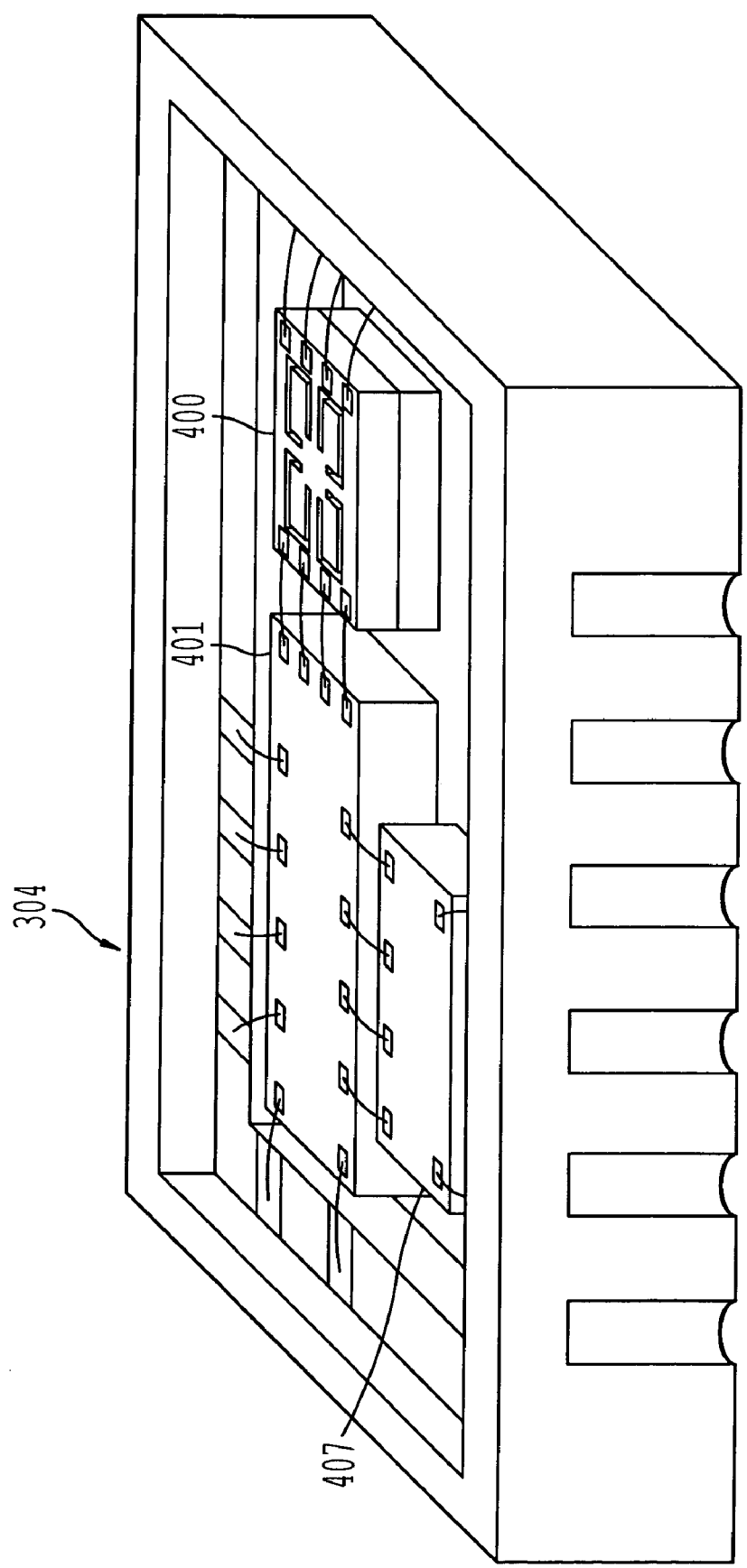
FIG. 4 is a perspective view of an exemplary acceleration sensor module in the anti-theft device shown in FIG. 3.

FIG. 4 is a perspective view of an exemplary acceleration sensor module in the anti-theft devices 1, 201 shown in FIG. 3. Referring to FIG. 4, the three-dimensional acceleration sensor module 304 includes an acceleration senor 400 (accelerometer), an IC 401 including a temperature sensor 402, an analog-digital conversion unit 403 and a controller 404, and an EEPROM 407. For the acceleration senor 400, a three-axis semiconductor acceleration sensor having a bridge circuit using a piezoelectric element may be used. This type of three-axis semiconductor acceleration sensor generates a voltage relative to an acceleration applied thereto as an output from the bridge circuit. Such a semiconductor acceleration sensor is disclosed in Japanese Unexamined Patent Application Publications, Nos 6-331646, 6-109755 and 8-327656, and the contents of these documents are incorporated herein by reference in their entirety.

Figure 5:
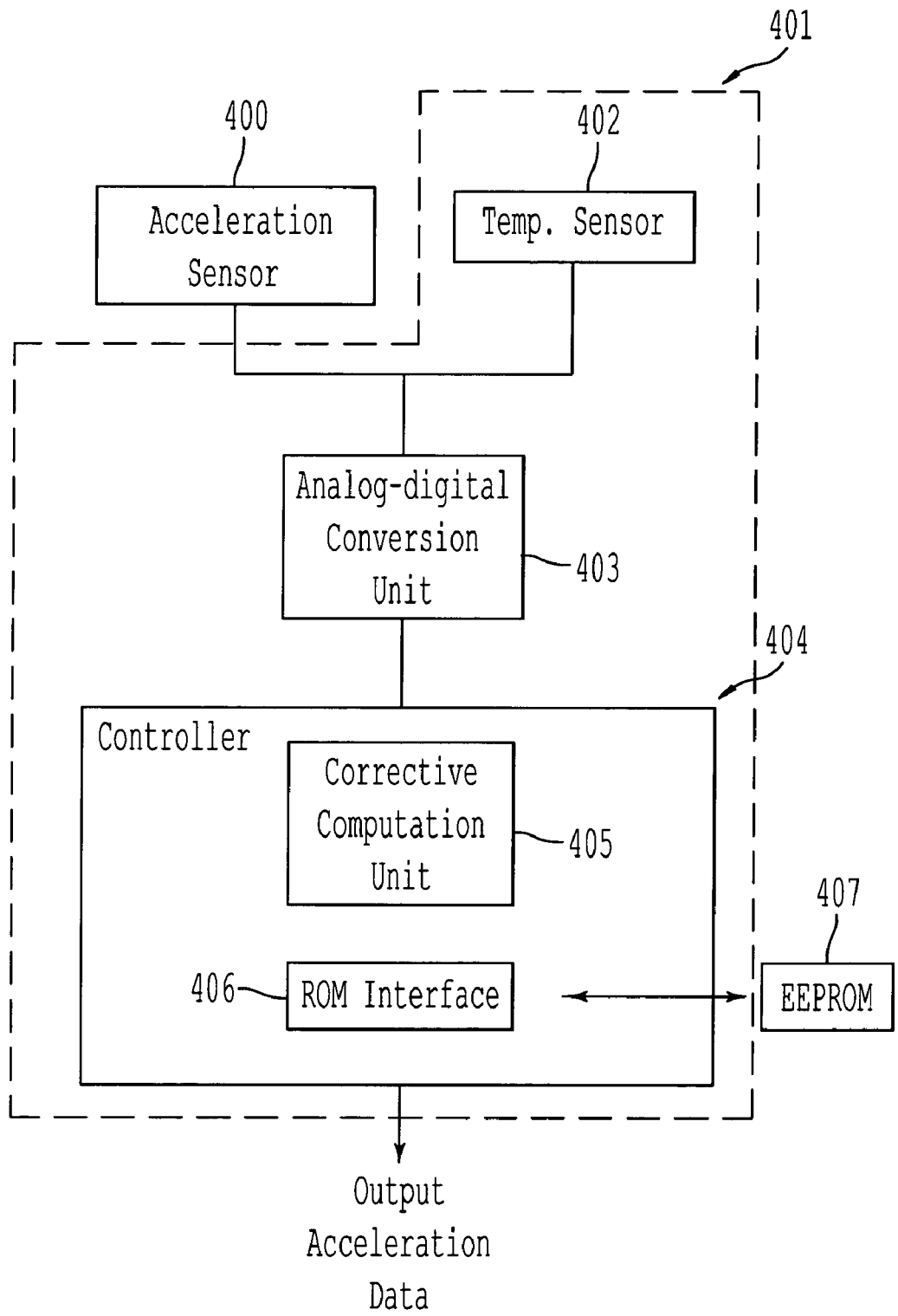
FIG. 5 is a block diagram of a sensory function based on the acceleration sensor module shown in FIG. 4.
Figure 6:
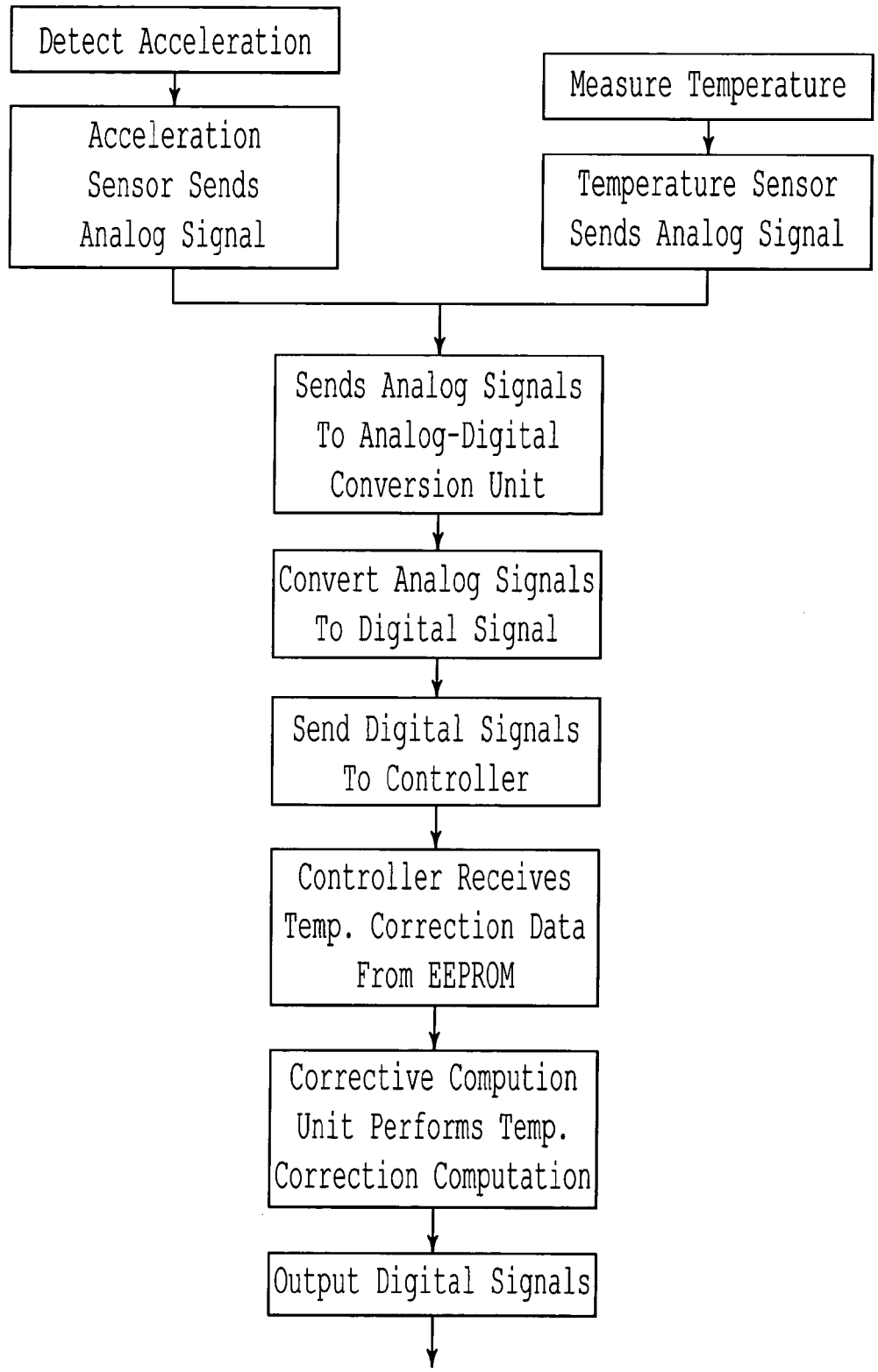
FIG. 6 is a flow chart of the sensory function based on the acceleration sensor module shown in FIG. 5.

FIG. 5 is a block diagram of a sensory function based on the acceleration sensor module 304 shown in FIGS. 3 and 4, and FIG. 6 is a flow chart of the sensory function based on the acceleration sensor module 304 shown in FIG. 5. Referring to FIGS. 4 and 5, the acceleration sensor 400 and temperature sensor 402 are connected to the analog-digital conversion unit 403, the analog-digital conversion unit 403 is connected to the controller 404 having a corrective computation unit 405 and a ROM interface 406, and the controller 404 outputs acceleration data and communicates with an EEPROM 407. Referring to FIGS. 4 and 6, the acceleration sensor 400 and temperature sensor 402 sense acceleration and temperature, respectively. The acceleration sensor 400 and temperature sensor 402 generate and send analog signals to the analog-digital conversion unit 403. After the analog-digital conversion unit 403 converts the analog signals to digital signal, the controller 404 reads acceleration and temperature data stored in the EEPROM 407, performs corrective computation based on the acceleration and temperature data, and subsequently outputs digital data.

Figure 7:
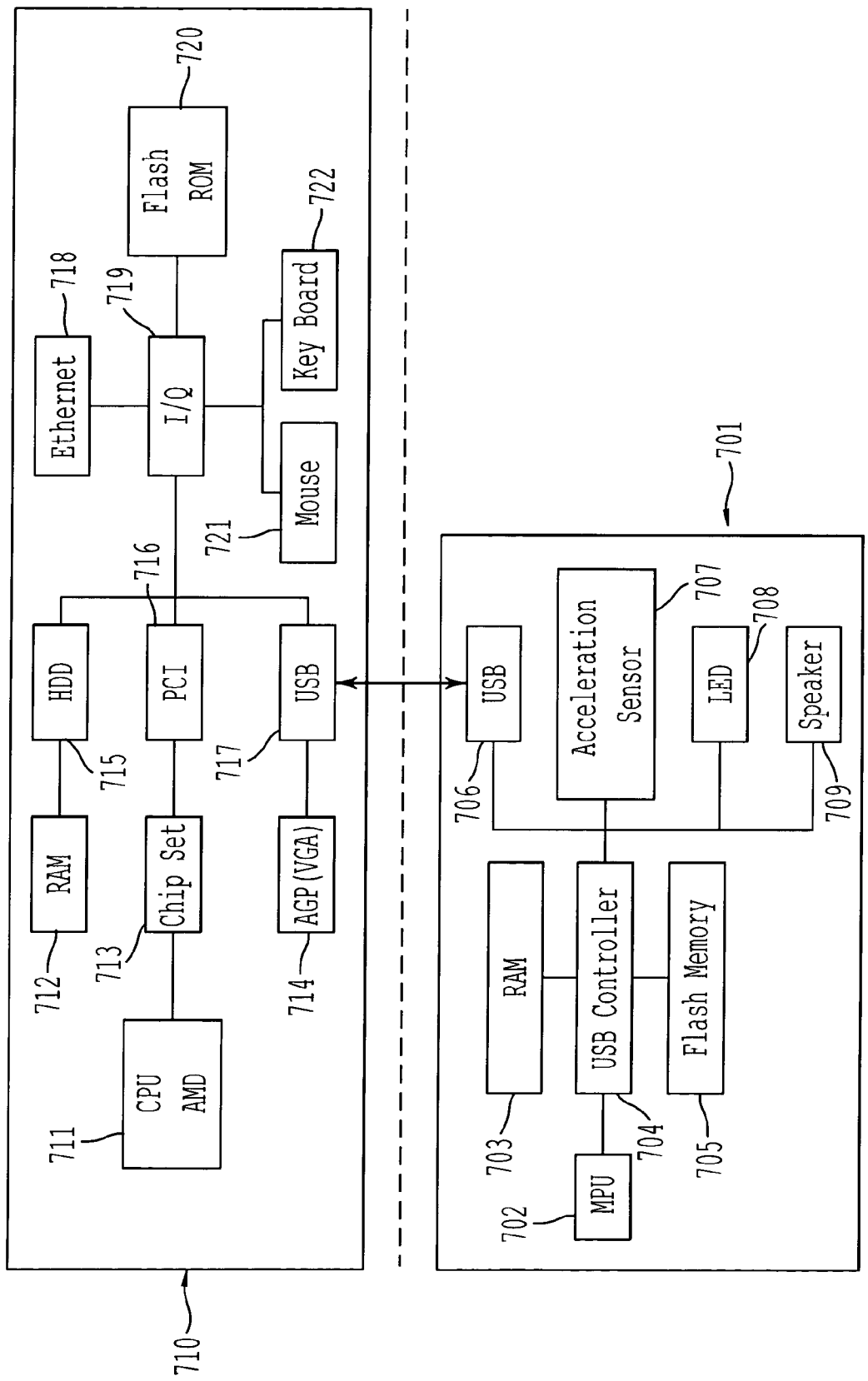
FIG. 7 is a block diagram showing a basic structural connection between an anti-theft device according to another embodiment of the present invention and a personal computer.
Figure 8:
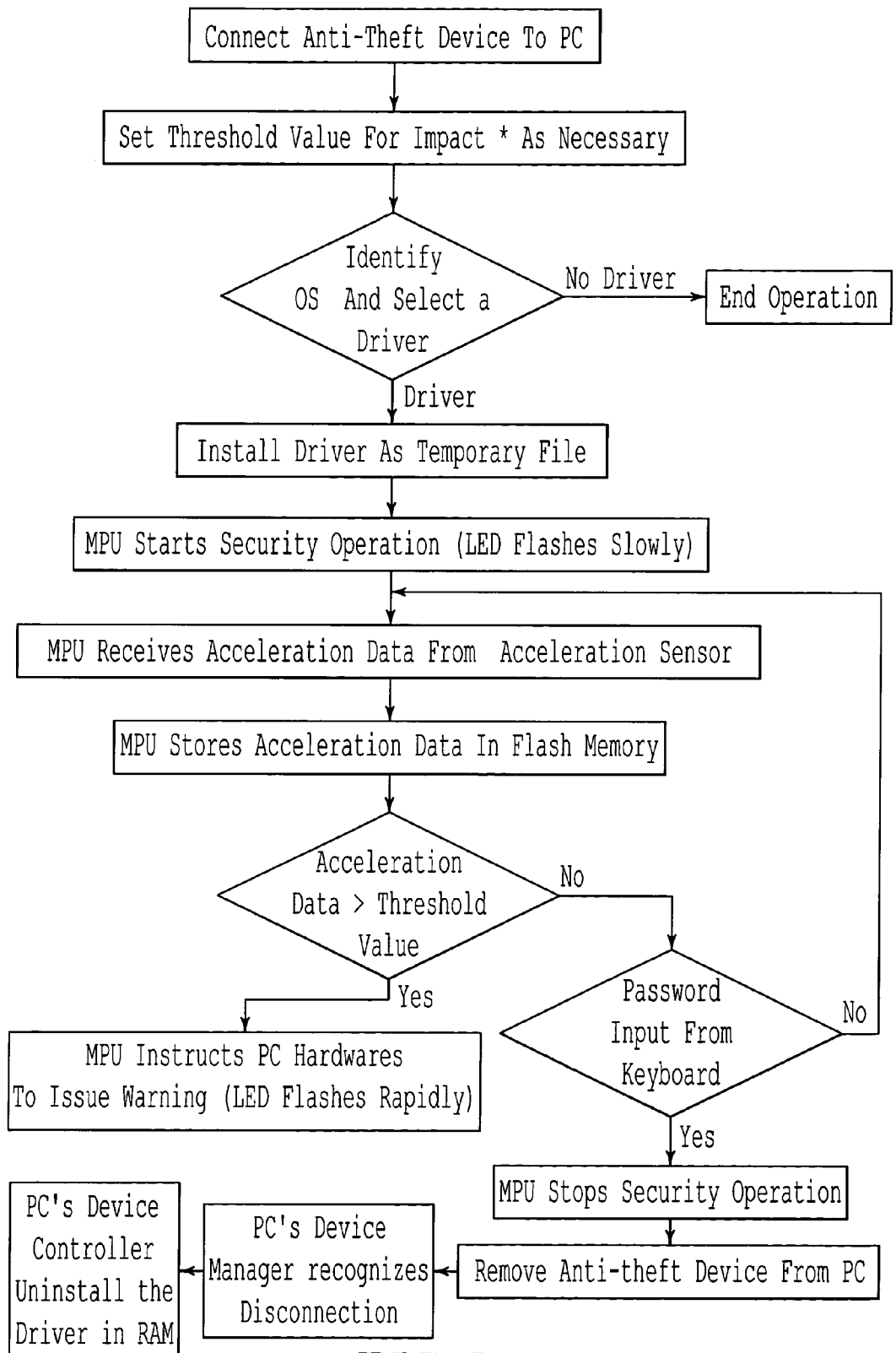
FIG. 8 is a flow chart showing installation and uninstallation process of a driver for the anti-theft device shown in FIG. 7.

FIG. 7 is a block diagram showing a basic structural connection between a personal computer and an anti-theft device according to another embodiment of the present invention, and FIG. 8 is a flow chart showing installation and uninstall processes of a driver for the anti-theft device shown in FIG. 7. Referring to FIG. 7, an anti-theft device 701 includes an MPU 702, a RAM 703, a USB controller 704, a flash memory 705, a USB 706, a acceleration sensor 707, an LED 708 and/or a speaker 709, and a personal computer device 710 includes a CPU 711, a RAM 712, a chip set 713, an AGP(VGA) 714, an HDD 715, a PCI 716, a USB 717, an ethernet 718, an I/O 719, a flash memory 720, a mouse 721, and a keyboard 722. Referring to FIG. 8, when the anti-theft device 701 is inserted into the personal computer 710 and connected thereto via USB interface (i.e., the USBs 706, 717), the MPU 702 in the anti-theft device 701 recognizes an OS (operation system) stored in the chip set 713 in the personal computer device 710 via the USB controller 704, USB interface, and PCI 716. Based on the OS, the MPU 702 selects an appropriate driver from various drivers stored in the flash memory 705 via the USB controller 704, and temporarily installs a selected driver in the RAM 712 via the USB controller 704, USB interface, PCI 716, chip set 713 and CPU 711. Therefore, no separate installation of a driver prior to its use is required, nor is it necessary to use a separate installation device such as an floppy disk or a CD ROM for driver installation. As such, the anti-theft device 701 according to this embodiment can be easily used and shared among friends and family at anywhere and anytime. Once the MPU 702 starts security operation, the MPU 702 recognizes through the USB controller 704 a threshold value of acceleration data stored in the flash memory 705 for recognizing impact on or movement of the personal computer device 710. The MPU 702 obtains acceleration data from the acceleration sensor 707 via the USB controller 704, and performs comparative computation of the threshold value and acceleration data. If the acceleration data exceeds the threshold value, the MPU 702 instructs via the USB controller 704, USB interface, PCI 716 and chip set 713 the CPU 711 to operate a program in the driver temporarily installed in the RAM 712. Subsequently, the CPU 711 operates the program stored in the RAM 712 via the chip set 713, thereby issuing a warning signal from the personal computer 710, for example, alarm sound from a speaker in the personal computer 710. Also, as a part of the warning signal, the LED 708 may flash rapidly, and/or the speaker 709 may generate noticeable sounds. When the USB interface is disconnected, the device manager in the personal computer device 710 recognizes that it is no longer connected to the MPU 702, and the driver temporarily installed in the RAM 712 is automatically removed from the RAM 712 by the device controller in the personal computer device 710. That is, the device manager in the personal computer device 710 routinely checks the status of its peripheral hardware devices at a certain interval, thereby allowing it to recognize the connection to the anti-theft device 701 and automatically uninstalling the driver installed as a temporary file in the RAM 712.

Figure 9:
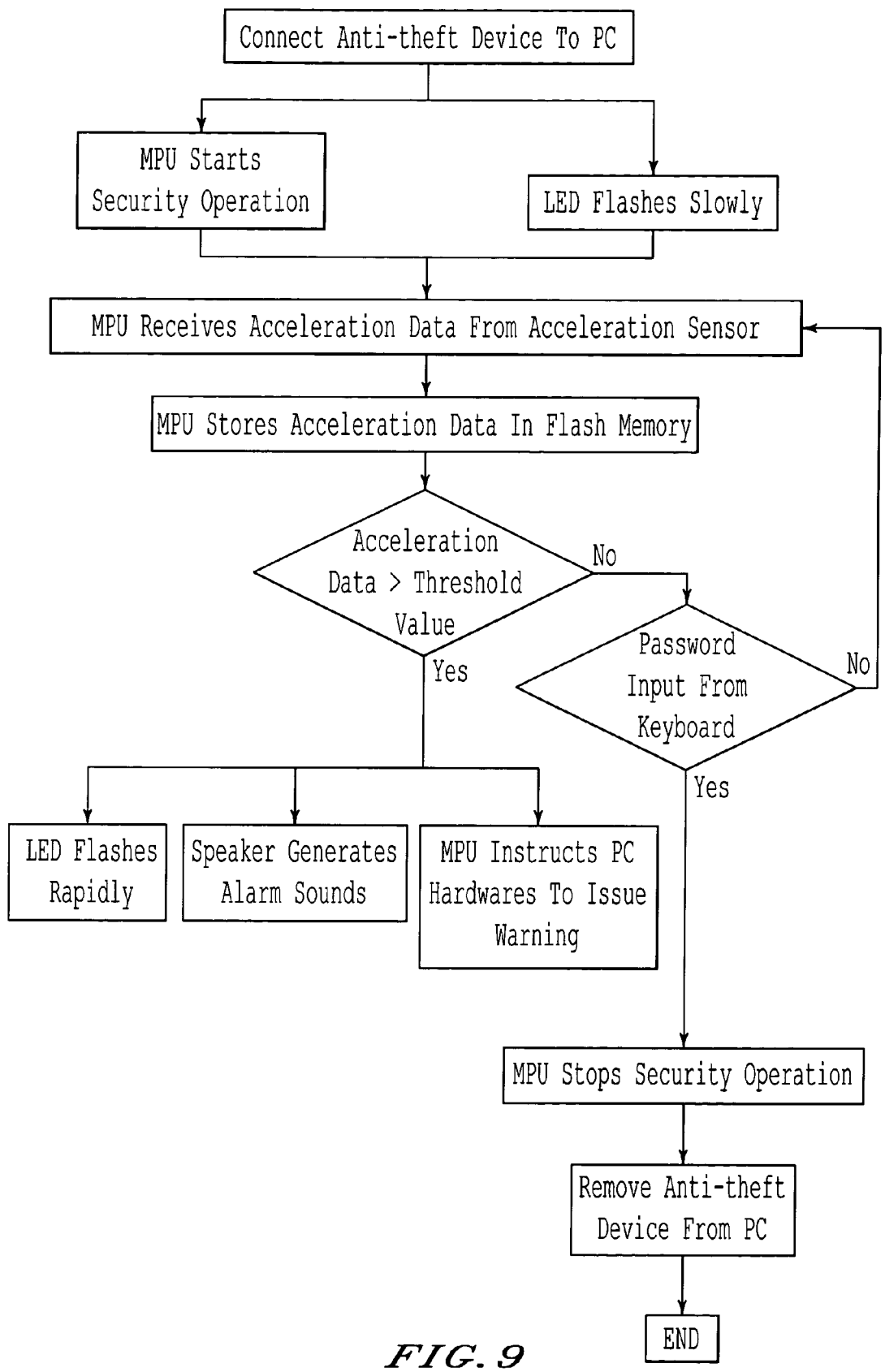
FIG. 9 is a flow chart showing a basic operation of the anti-theft device shown in FIG. 7 without a touch motion function.

FIG. 9 is a flow chart showing a basic operation of the anti-theft device shown in FIG. 7 without a touch motion function. Referring to FIGS. 7 and 9, after the anti-theft device 701 is inserted into the USB 718 in the personal computer device 710, the MPU 702 begins a security operation as the LED 708 slowly flashes. Then, the MPU 702 receives acceleration data output from the acceleration sensor 707, and records the acceleration data in the flash memory 705. Subsequently, the MPU 702 performs comparative computation based on the acceleration data and the threshold value. If the acceleration data exceeds the threshold value, the MPU 702 instructs the LED to flash rapidly and the personal computer device 710 to issue a warning signal. On the other hand, if the acceleration data does not exceed the threshold value, the anti-theft device 701 continues the security operation. However, if there is an input of a password through the keyboard 722 at this stage, the anti-theft device halts the security operation, and the anti-theft device 701 may be disconnected from the personal computer device 710.

Figure 10A:
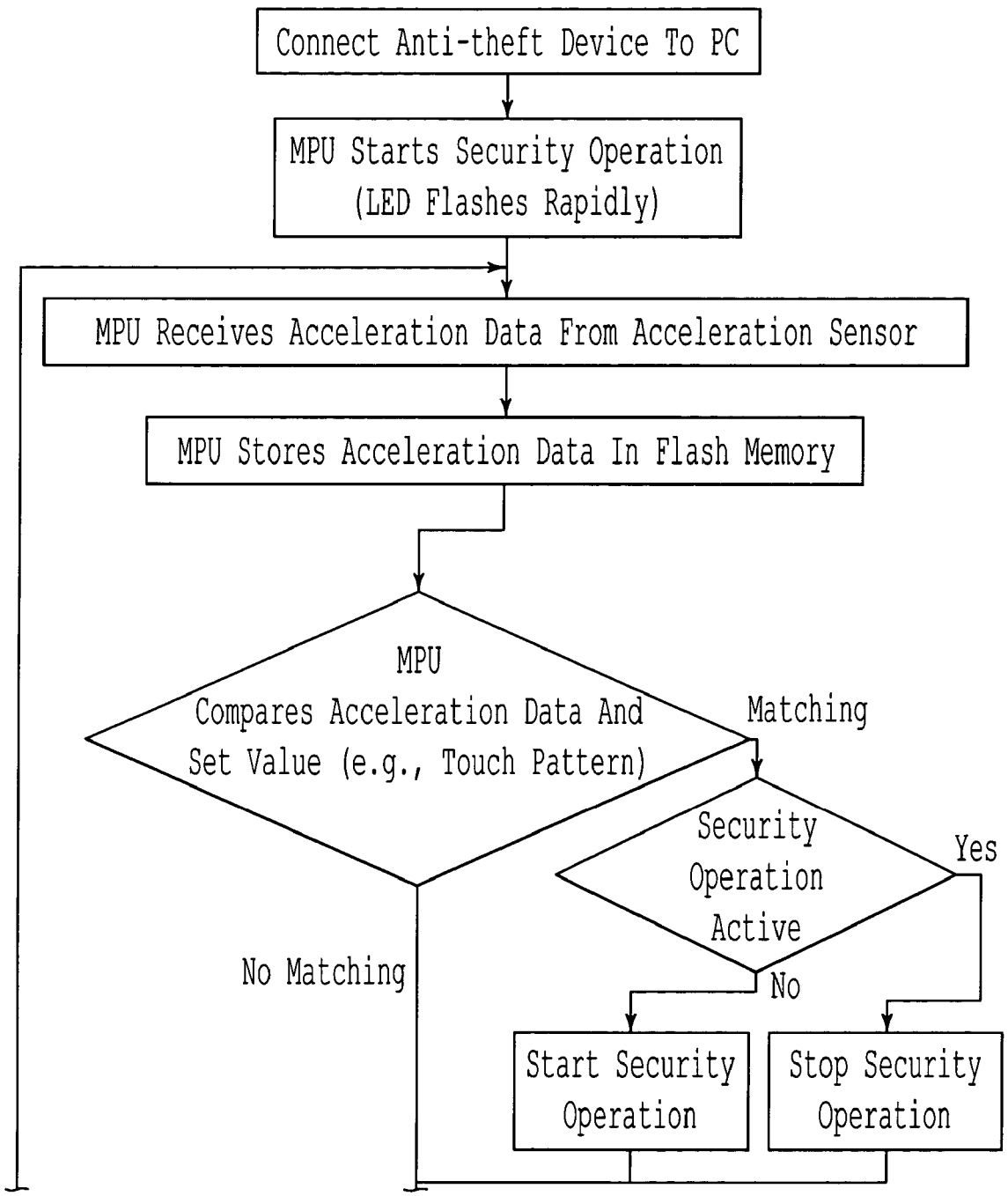
FIG. 10 is a flow chart showing a basic operation of the anti-theft device shown in FIG. 7 in a touch motion function.
Figure 10B:
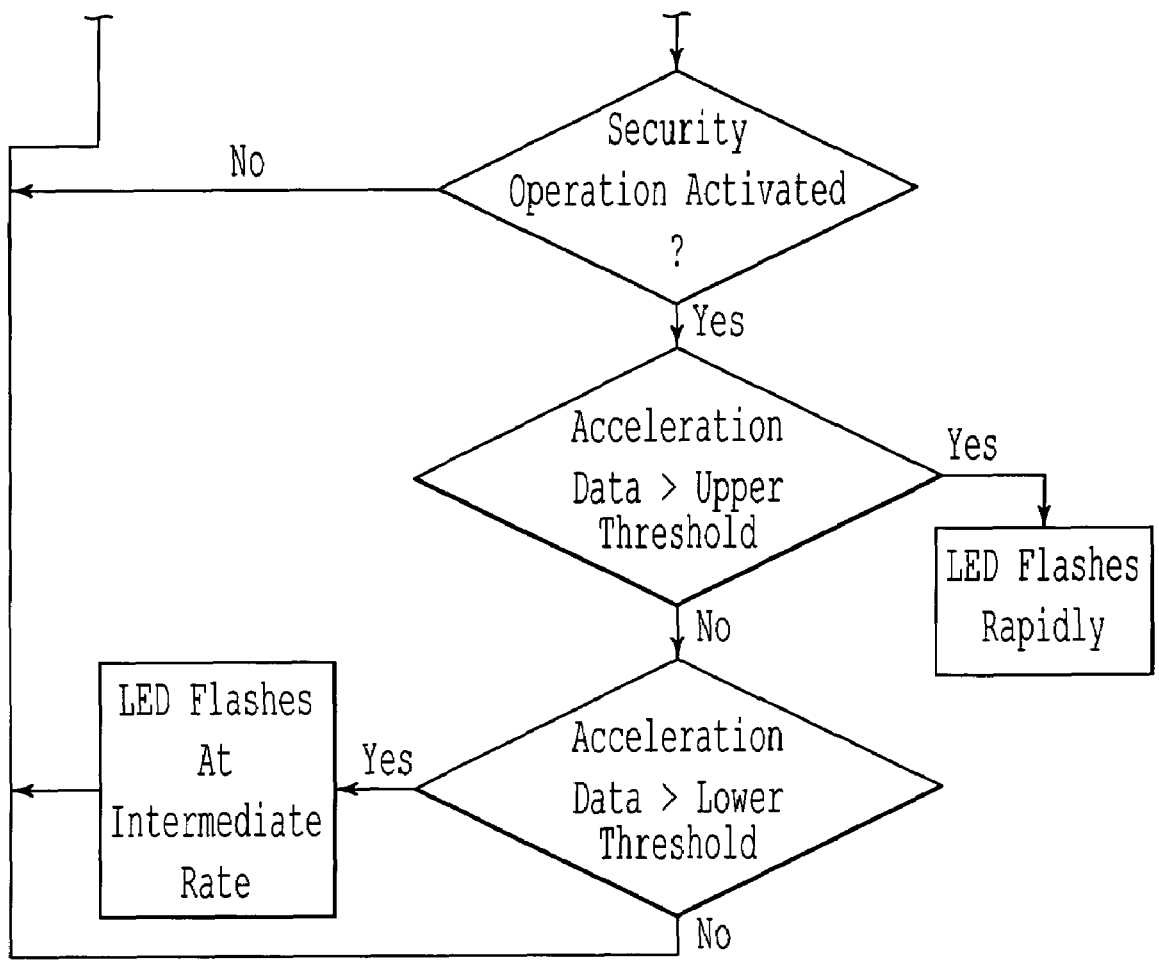

FIG. 10 is a flow chart showing a basic operation of the anti-theft device shown in FIG. 7 in a touch motion function. Referring to FIGS. 7 and 10, once the anti-theft device 701 is inserted into the USB 718 in the personal computer device 710, and the MPU 702 selects an appropriate driver from the flash memory 705 and temporarily installs it in the RAM 712, the MPU 702 recognizes via the USB controller 704 a set value, for example, a touch pattern, for a touch motion operation previously stored in the flash memory 705. When the MPU 702 obtains acceleration data from the acceleration sensor 707 via the USB controller 704, the MPU 702 performs comparative computation based on the set value and the acceleration data. If the acceleration data matches with the set value, e.g., the acceleration data is an impact on the anti-theft device 701 intentionally caused by a user who is repeating the touch pattern previously saved in the flash memory 705, the MPU 701 instructs the CPU 711 in the personal computer device 710 to either stop or begin the security operation depending on the status of the security operation. In other words, if the security operation is already active, the CPU 711 stops the security operation, and if the security operation is not active, the CPU 711 activates the security operation. On the contrary, if the acceleration data does not match with the set value, the MPU 702 performs comparative computation based on the acceleration data and an upper threshold value stored in the flash memory 705. If the acceleration data exceeds the upper threshold value, the MPU 702 instructs via the CPU 711 the personal computer device 710 to issue a warning signal, and the LED 708 flashes rapidly. If the acceleration data does not exceed the upper threshold value, the MPU 702 performs comparative computation based on the acceleration data and a lower threshold value stored in the flash memory 705. If the acceleration data exceeds the lower threshold value, the MPU 702 instructs via the CPU 711 the personal computer device 710 to issue a warning signal, and the LED 708 flashes at an intermediate rate. The warning signal for the lower threshold value may be different from the warning signal for the upper threshold value. However, if the acceleration data does not exceed the lower threshold value, the anti-theft device 701 continues the security operation. In this embodiment, the flash memory 705 may receive acceleration data in cycle, thereby allowing the MPU 702 to perform comparative computation based on acceleration data received in a certain period of time, for example, one second, and the set value or touch pattern stored in the flash memory 705 for matching. The flash memory 705 continuously updates and keeps the latest acceleration data obtained during a certain period of time.

Figure 11:
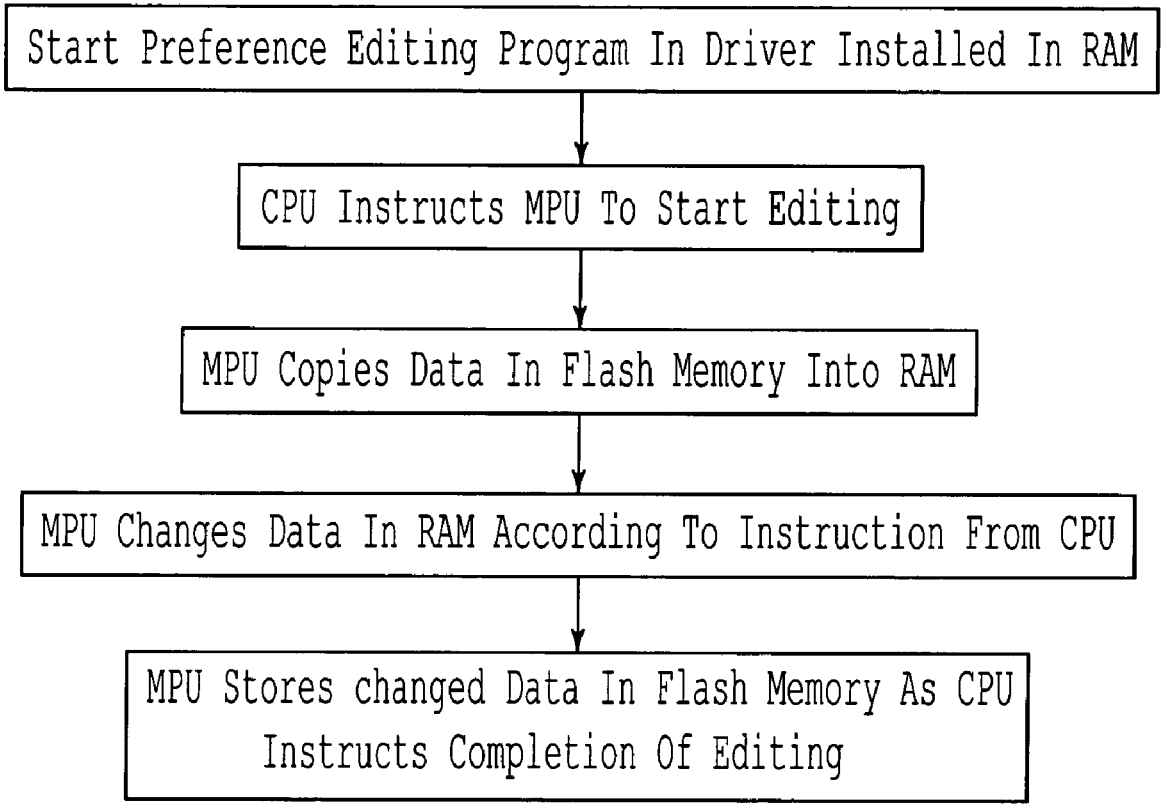
FIG. 11 is a flow chart showing a direct editing function of the anti-theft device shown in FIG. 7.

FIG. 11 is a flow chart showing a direct editing function for editing a preference setting of the anti-theft device shown in FIG. 7. Referring to FIGS. 7 and 11, once the anti-theft device 701 is inserted into the USB 717 in the personal computer device 710, and the MPU 702 selects an appropriate driver from the flash memory 705 and temporarily installs it in the RAM 712, a user utilizes the mouse 721 or the keyboard 722 to activate a preference editing program in the driver temporarily installed in the RAM 712, and instructs the CPU 711 to run the preference editing program for editing a preference, e.g., setting or changing the set value, e.g., touch pattern, or the threshold values. Thereby, the CPU 711 starts the preference editing program in the RAM 712 via the chip set 713. Also, the CPU 711 instructs the MPU 702 to start editing the preference via the chip set 713, PCI 716, USB interface, and USB controller 704. The MPU 702 recognizes the preference previously stored in the flash memory 705, and copies the data for the preference to the RAM 703. The user follows instructions from the preference editing program, and makes the anti-theft device 701 recognize a new preference by applying a certain impact upon the anti-theft device 701. The MPU 702 obtains via the USB controller 704 acceleration data from the acceleration sensor 707 based on the applied impact as the new preference. Furthermore, the MPU 704 records the acceleration data for the new preference in the RAM 704 via the USB controller 704. The user follows instructions provided by the preference editing program and instructs the CPU 711 to end the preference editing program. The CPU 717 instructs the MPU 704 to end the editing of the preference via the chip set 713, PCI 716, USB interface, and USB controller 704. The MPU 702 recognizes the new preference stored in the RAM 703 and records the new preference in the flash memory 705 via the USB controller 704. Because of the direct editing function for editing a preference setting described above, the anti-theft device according to this embodiment allows a user to directly edit preference settings without relying on a separately installed specific driver and an operation system in a computer device, thereby preventing sniffing and altering data based on preference history.

Figure 12:
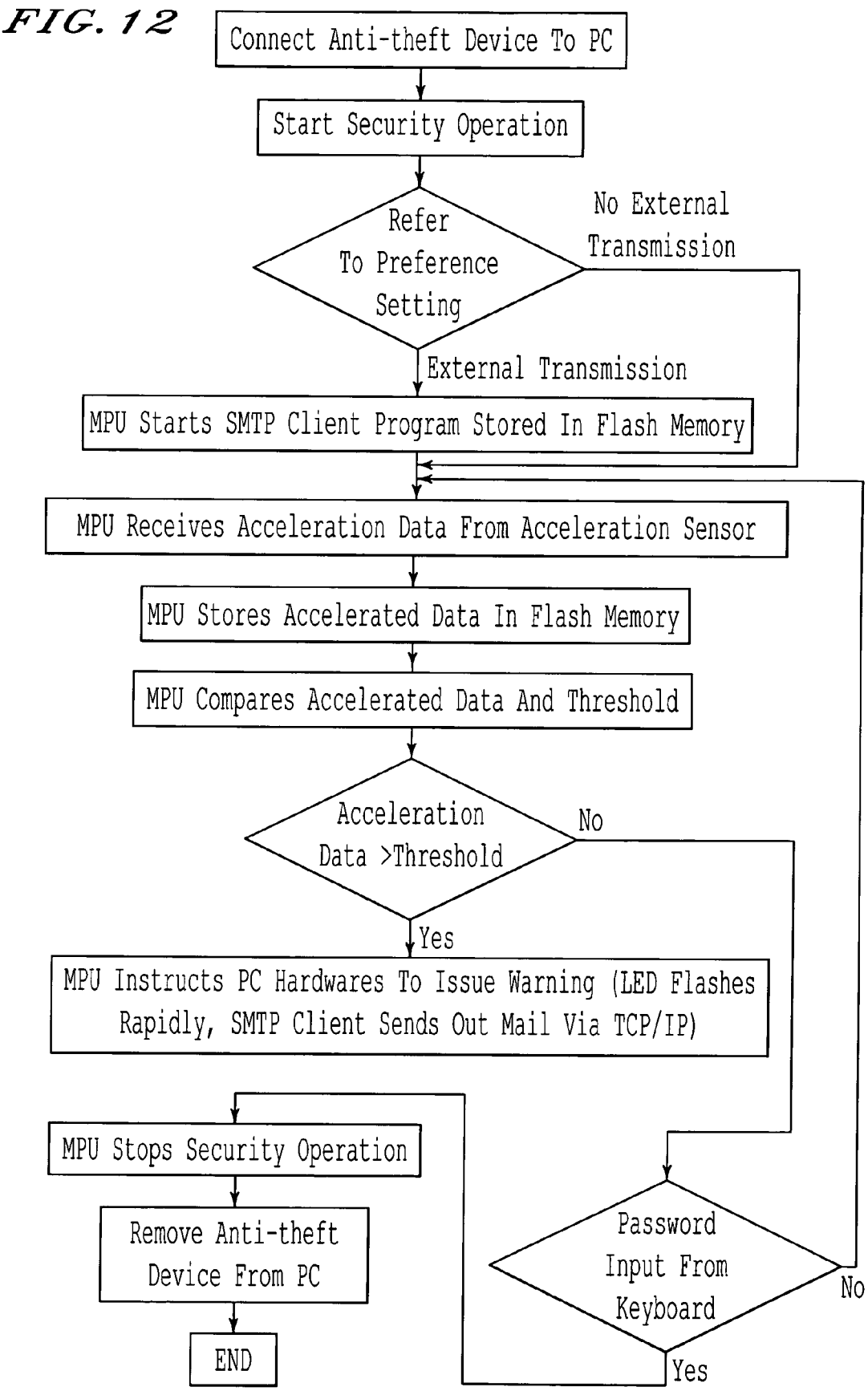
FIG. 12 is a flow chart showing a net client function of the anti-theft device shown in FIG. 7.

FIG. 12 is a flow chart of an external transmission function using a net client function according to the anti-theft device shown in FIG. 7. Referring to FIGS. 7 and 12, once the anti-theft device 701 is inserted into the USB 717 in the personal computer device 710, and the MPU 702 temporarily installs an appropriate driver from the flash memory 705 in the RAM 712 and starts the security operation, if a preference setting of the anti-theft device 701 is set up such that the anti-theft device 701 externally transmits a detection of abnormality, e.g., theft, the MPU 702 recognizes an SMTP client program previously stored in the flash memory 705, copies it into the RAM 703, and starts the SMTP client program. During the security operation, the MPU 702 recognizes via the USB controller 704 the threshold value for recognizing an abnormal impact previously stored in the flash ROM 705. Further, the MPU 702 obtains acceleration data from the acceleration sensor 707 via the USB controller 704. The MPU 702 performs comparative computation based on the threshold value and acceleration data, and if the acceleration value exceeds the threshold value, the MPU 702 operates the SMTP client program, and automatically sends an abnormality report mail data to outside devices via the USB controller 704, USB interface, I/O 719, and ethernet 718. By providing such a net client function in the anti-theft device 701, a protection system can be easily established through a net work, for example, in a work place, a school, and a library.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An anti-theft device for a computer device, comprising:
    a main body having at least one protrusion portion which protrudes from the computer device when the body is connected to the computer device;
    an acceleration sensor provided in the main body and configured to detect impact;
    a detection processing unit positioned in the main body and configured to output a signal based on the impact detected by the acceleration sensor;
    a first memory unit including a driver program which facilitates communication between the detection processing unit and the computer device;
    a program transfer unit which temporarily installs the driver program in the computer device;
    a connector configured to attach the body to the computer device and facilitate electrical connection between the computer device and detection processing unit; and
    an indicator configured to provide indication according to the signal and positioned on the body.

2. The anti-theft device according to claim 1, wherein the acceleration sensor comprises a three-axis acceleration sensor.

3. The anti-theft device according to claim 1, wherein the indicator comprises a light emitting device configured to emit visible light and is positioned on the at least one protrusion portion of the main body.

4. The anti-theft device according to claim 3, wherein the light emitting device is configured to change a flashing pattern of the visible light being emitted based on the signal output by the detection processing unit according to an intensity of the impact.

5. The anti-theft device according to claim 3, wherein the light emitting device comprises at least one LED.

6. The anti-theft device according to claim 1, wherein the indicator comprises a sound generating device configured to generate audible sound.

7. The anti-theft device according to claim 6, wherein the sound generating device is configured to change a volume of the audible sound being generated based on the signal output by the detection processing unit according to an intensity of the impact.

8. The anti-theft device according to claim 2, wherein the driver program includes an alarm indication program which indicates an alarm message on a display device of the computer device when the detection processing unit determines the impact constitutes a theft.

9. The anti-theft device according to claim 2, wherein the driver program is installed in a RAM unit in the computer device such that the driver program is automatically uninstalled from the computer device when the connector is disconnected from the computer device.

10. The anti-theft device according to claim 1, further comprising a second memory unit configured to store setting data which the driver program utilizes.

11. The anti-theft device according to claim 10, wherein the setting data include preference settings including at least one of a password, a set value for determining whether the impact constitutes a password to activate and deactivate a security operation, and at least one threshold value for determining whether the impact constitutes a theft.

12. The anti-theft device according to claim 2, wherein the driver program includes a network transmission program which sends out data through a network connection device in the computer device.

13. The anti-theft device according to claim 1, wherein the detection processing unit is configured to determine whether the impact constitute a certain touch pattern and switch a security operation between an activated state and a deactivated state when the certain touch pattern is detected.

14. The anti-theft device according to claim 1, wherein the connector is configured to be connected to a USB port.

15. The anti-theft device according to claim 1, wherein the connector is configured to be engaged into a PCMCIA card slot.

16. The anti-theft device according to claim 1, wherein the detection processing unit comprises an MPU, a flash memory, and a RAM.

17. The anti-theft device according to claim 1, wherein the detection processing unit is configured to perform comparative computation based on the impact and at least one threshold value and determine whether the impact constitute a theft.

18. The anti-theft device according to claim 1, wherein the indicator is configured to continuously provide a warning indication once the connector is connected to the computer device.

19. The anti-theft device according to claim 18, wherein the indicator is configured to provide the indication which is different from the warning indication when the detection processing unit determines that the impact constitutes a theft, and the detection processing unit is configured to instruct the computer device to issue a secondary indication using at least one hardware in the computer device.

20. A method for protecting a computer device, comprising:
    providing an anti-theft device including a main body having at least one protrusion portion which protrudes from the computer device when the body is connected to the computer device, an acceleration sensor provided in the main body and configured to detect impact, a detection processing unit positioned in the main body and configured to output a signal based on the impact detected by the acceleration sensor, a first memory unit including a driver program which facilitates communication between the detection processing unit and the computer device, a program transfer unit which temporarily installs the driver program in the computer device, a connector configured to attach the body to the computer device and facilitate electrical connection between the computer device and detection processing unit, and an indicator configured to provide indication according to the signal and positioned on the body;
    attaching the anti-theft device to a computer device via the connector;
    temporarily installing the driver program in the computer device by the program transfer unit; and
    facilitating communication between the detection processing unit and the computer device by the driver program.

* * * * *